(12) United States Patent
Yamazaki et al.

(10) Patent No.: US 10,393,389 B2
(45) Date of Patent: Aug. 27, 2019

(54) TOP PLATE FOR COOKING DEVICE

(71) Applicant: Nippon Electric Glass Co., Ltd., Shiga (JP)

(72) Inventors: Yusuke Yamazaki, Shiga (JP); Toshimasa Kanai, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 274 days.

(21) Appl. No.: 15/514,606

(22) PCT Filed: Sep. 1, 2015

(86) PCT No.: PCT/JP2015/074821
§ 371 (c)(1),
(2) Date: Mar. 27, 2017

(87) PCT Pub. No.: WO2016/059899
PCT Pub. Date: Apr. 21, 2016

(65) Prior Publication Data
US 2017/0227234 A1 Aug. 10, 2017

(30) Foreign Application Priority Data

Oct. 17, 2014 (JP) .................................. 2014-212280

(51) Int. Cl.
*F21V 11/00* (2015.01)
*F24C 15/10* (2006.01)
(Continued)

(52) U.S. Cl.
CPC .............. *F24C 15/10* (2013.01); *C03C 17/22* (2013.01); *C03C 17/245* (2013.01); *C03C 17/28* (2013.01);
(Continued)

(58) Field of Classification Search
CPC ....................................................... F24C 15/10
(Continued)

(56) References Cited

U.S. PATENT DOCUMENTS 5,942,331 A      8/1999  Miyauchi et al.
7,718,929 B2 *   5/2010  Shimatani ............... C03C 17/06
                                                      219/443.1
(Continued)

FOREIGN PATENT DOCUMENTS

JP       2005-55005       3/2005
JP       2009-139055      6/2009
(Continued)

OTHER PUBLICATIONS

Supplementary European Search Report dated May 3, 2018 in corresponding European Patent Application No. 15850758.2.
(Continued)

*Primary Examiner* — Avinash A Savani
(74) *Attorney, Agent, or Firm* — Wenderoth, Lind & Ponack, L.L.P.

(57) ABSTRACT

Provided is a top plate for a cooking device including a glass sheet (2) and a light-shielding film (3) formed on a lower surface (2c) of the glass sheet (2) through sputtering. The light-shielding film (3) contains an oxide, a nitride, or an oxynitride of a transition metal of Group 6 to Group 11 on the periodic table. In this manner, a color close to grey can be achieved as a color of the light-shielding film (3) while insulating properties of the light-shielding film (3) are secured.

8 Claims, 1 Drawing Sheet

(51) Int. Cl.
*C03C 17/22* (2006.01)
*C03C 17/245* (2006.01)
*H05B 6/12* (2006.01)
*F21V 3/06* (2018.01)
*F21V 33/00* (2006.01)
*G06F 3/041* (2006.01)
*C03C 17/28* (2006.01)
*C03C 17/34* (2006.01)
*F21Y 113/13* (2016.01)
*F21Y 115/10* (2016.01)

(52) U.S. Cl.
CPC ...... *C03C 17/3411* (2013.01); *C03C 17/3482* (2013.01); *F21V 3/061* (2018.02); *F21V 11/00* (2013.01); *F21V 33/0044* (2013.01); *G06F 3/041* (2013.01); *H05B 6/12* (2013.01); *C03C 2217/213* (2013.01); *C03C 2217/217* (2013.01); *C03C 2217/219* (2013.01); *C03C 2217/281* (2013.01); *C03C 2218/156* (2013.01); *F21Y 2113/13* (2016.08); *F21Y 2115/10* (2016.08)

(58) Field of Classification Search
USPC ........................ 126/39 H, 220, 39 J
See application file for complete search history.

(56) References Cited

U.S. PATENT DOCUMENTS

| | | |
|---|---|---|
| 2003/0186799 A1 | 10/2003 | Beyrle |
| 2004/0161614 A1 | 8/2004 | Athey et al. |
| 2010/0269813 A1* | 10/2010 | Ikegami ............ F24C 15/10 |
| | | 126/220 |
| 2012/0125314 A1 | 5/2012 | Alonso Esteban et al. |
| 2012/0315410 A1 | 12/2012 | Heithoff et al. |

FOREIGN PATENT DOCUMENTS

| | | |
|---|---|---|
| JP | 2010-159171 | 7/2010 |
| WO | 2013/001414 | 1/2013 |

OTHER PUBLICATIONS

International Search Report dated Oct. 13, 2015 in International (PCT) Application No. PCT/JP2015/074821.
Extended European Search Report dated Jun. 25, 2018 in corresponding European Patent Application No. 15850758.2.
International Preliminary Report on Patentability and Written Opinion of the International Searching Authority dated Apr. 18, 2017 in corresponding International (PCT) Application No. PCT/JP2015/074821.

\* cited by examiner

TOP PLATE FOR COOKING DEVICE

TECHNICAL FIELD

The present invention relates to a top plate for a cooing device, comprising a glass sheet and a light-shielding film formed on the glass sheet.

BACKGROUND ART

As a top plate for a cooking device such as an electromagnetic heating cooking device, an infrared heating cooking device, or a gas cooking device, there exists a top plate including a glass sheet. On the glass sheet, a light-shielding film made of a metal, e.g., Ti is formed. The light-shielding film visually shields a heater or the like arranged inside the cooking device, thereby providing good appearance to the cooking device.

In recent years, a top plate including a touch panel having a surface of the glass sheet as a touch surface has been manufactured for the purpose of improving convenience of the cooking device. This kind of top plate requires enhanced insulating properties by reducing electrical conductivity of the light-shielding film formed on the glass. Therefore, a light-shielding film made of a semiconductor is formed on the glass sheet in some cases in place of the light-shielding film made of a metal.

An example of such a top plate is disclosed in Patent Literature 1. In the top plate for a cooking device disclosed in Patent Literature 1, a light-shielding film made of Si being a semiconductor is formed on the glass sheet. As a result, as compared to the light-shielding film made of a metal, the insulating properties can be enhanced.

CITATION LIST

Patent Literature

Patent Literature: JP 2009-139055 A

SUMMARY OF INVENTION

Technical Problem

However, the top plate for a cooking device disclosed in Patent Literature 1 has the following problem. Specifically, the light-shielding film made of Si has low transmissivity to light having a short wavelength and has high transmissivity to light having a long wavelength in a visible light region. This property makes the light-shielding film made of Si be liable to have a color close to red (for example, reddish brown).

For the top plate for a cooking device, there are demands for use of various colors other than red (for example, achromatic colors (such as grey)) as the color of the light-shielding film. With the above-mentioned light-shielding film made of Si, the insulating properties can be enhanced. However, in actuality, it has been impossible to achieve the requested color.

The present invention, which has been made in view of the above-mentioned circumstances, has a technical object to achieve various colors other than red as a color of a top plate for a cooking device comprising a glass sheet and a light-shielding film formed on the glass sheet, while securing insulating properties of the light-shielding film.

Solution To Problem

According to one embodiment of the present invention, which has been devised to achieve the above-mentioned object, there is provided a top plate for a cooking device, comprising: a glass sheet; and a light-shielding film formed on one surface of the glass sheet through sputtering, wherein the light-shielding film contains an oxide, a nitride, or an oxynitride of a transition metal of Group 6 to Group 11 on a periodic table.

By turning the transition metals of Group 6 to Group 11 on the periodic table into the oxides, the nitrides, or the oxynitrides, various colors other than red can be achieved as a color thereof. Therefore, various colors other than red (for example, monochromatic colors (such as grey)) can be achieved as a color of the light-shielding film containing the oxide, the nitride, or the oxynitride of those transition metals. Further, the light-shielding film has a large electrical resistance, and hence insulating properties can be secured.

It is preferred that the light-shielding film contain an oxynitride of Cu or Cr.

When the light-shielding film containing the oxynitride of Cu is used as the light-shielding film, the insulating properties can be further improved while various colors other than red (color close to grey) are achieved as the color thereof. Further, when the light-shielding film containing the oxynitride of Cr is used as the light shielding film, the color can be made closer to grey while the insulating properties are secured. Specifically, when the insulating properties of the light-shielding film are prior to the color of the light-shielding film, it is suitable to use the light-shielding film containing the oxynitride of Cu. When the color of the light-shielding film is prior to the insulating properties of the light-shielding film, it is suitable to use the light-shielding film containing the oxynitride of Cr.

For the above-mentioned top plate for a cooking device, it is preferred that transmissivity to light having a wavelength of from 400 nm to 700 nm be in a range of from 3% to 43%.

In this manner, the transmissivity is reduced in the range of the wavelength of from 400 nm to 700 nm. Therefore, the light-shielding film becomes more suitable to visually shield an inside of the cooking device. Further, a fluctuation range of the transmissivity can also be reduced in the range of the wavelength of from 400 nm to 700 nm. As a result, when light emitted from a light-emitting diode is to be transmitted through the top plate for a cooking device, the emitted light is more easily transmitted uniformly therethrough regardless of the color of the light emitted from the light-emitting diode.

The above-mentioned light-shielding film may contain $SiO_2$, and CuO or CoO and may be formed by laminating a first layer having a content of CuO or CoO set from 0.01% to 30% by mass and a second layer made of Si.

The first layer has high transmissivity to light having a short wavelength and has low transmissivity to light having a long wavelength in a visible light region. Therefore, the first layer is likely to have a color close to blue. Further, the second layer has low transmissivity to the light having the short wavelength and has high transmissivity to the light having the long wavelength in the visible light region. Therefore, the second layer is likely to have a color close to red. In this manner, when the light-shielding film is formed by laminating the first layer and the second layer, the color thereof can be made close to grey. Further, according to the light-shielding film, the insulating properties can be secured. Still further, with the light-shielding film, the transmissivity can be extremely reduced in the visible light region. Therefore, the light-shielding film becomes more suitable to visually shield the inside of the cooking device.

The above-mentioned light-shielding film may contain two or more kinds of metal oxides selected from the group consisting of CoO, NiO, $Fe_2O_3$, $MoO_6$, $MnO_2$, and $Cr_2O_3$, and $SiO_2$ in which a content of the metal oxides is set to 0.01% to 60% by mass.

Even with the light-shielding film described above, various colors other than red can be achieved as the color thereof while the insulating properties of the light-shielding film are secured.

It is preferred that the above-mentioned light-shielding film have a value of an electrical resistance of 3 k$\Omega$/□ or larger.

In this manner, the value of the electrical resistance of the light-shielding film becomes sufficiently larger. Thus, the insulating properties can be further improved.

It is preferred that, for the above-mentioned top plate for a cooking device, a value obtained by dividing a maximum value of transmissivity to light having a wavelength of from 400 nm to 700 nm by a minimum value thereof be 4.0 or smaller.

In this manner, the fluctuation range of the transmissivity can be extremely reduced in the range of the wavelength of from 400 nm to 700 nm. Therefore, when the light beams emitted from the light-emitting diodes are transmitted through the top plate for a cooking device, the emitted light beams can be uniformly transmitted therethrough regardless of the colors of the light beams emitted from the light-emitting diodes.

The above-mentioned top plate for a cooking device may comprise: a touch sensor arranged on a side opposite to the glass sheet through the light-shielding film therebetween; and a light-emitting diode configured to emit light to be transmitted through the light-shielding film.

Advantageous Effects Of Invention

As described above, according to the present invention, it is possible to achieve various colors other than red as a color of the top plate for a cooking device comprising the glass sheet and the light-shielding film formed on the one surface of the glass sheet while insulating properties of the light-shielding film are secured.

DESCRIPTION OF EMBODIMENTS

A top plate for a cooking device according to embodiments of the present invention is described with reference to the accompanying drawings.
<First Embodiment>
First, a configuration of a top plate for a cooking device according to a first embodiment of the present invention is described.

Figure 1:
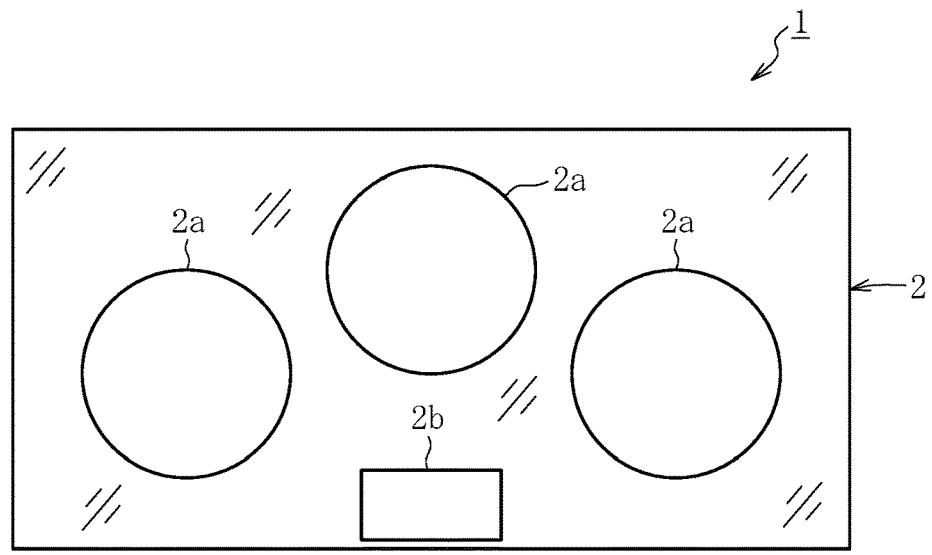
FIG. 1 is a plan view for illustrating a top plate for a cooking device according to a first embodiment of the present invention.

FIG. 1 is a plan view for illustrating a top plate 1 for a cooking device according to the first embodiment. As illustrated FIG. 1, the top plate 1 for a cooking device includes a single glass sheet 2 made of transparent crystallized glass having a transmissivity of 75% or higher to light having a wavelength of from 400 nm to 700 nm. The glass sheet 2 includes cooking parts 2a for cooking with a pan or the like placed on the glass sheet 2 and a touch panel part 2b including a touch panel configured to control temperature of a cooking device.

Figure 2:
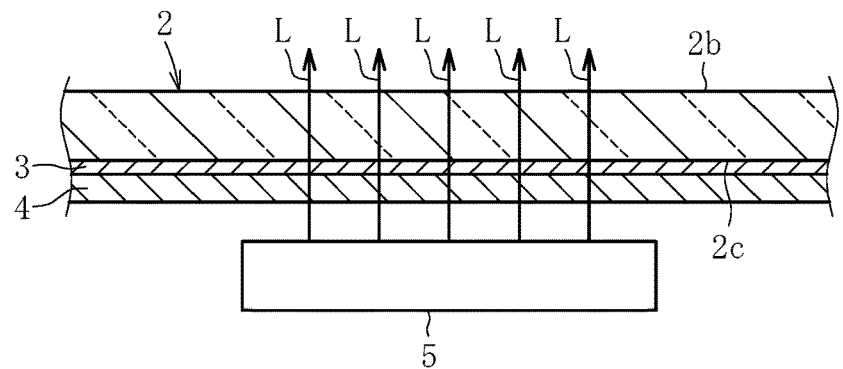
FIG. 2 is a vertical sectional front view for illustrating the vicinity of a touch panel part in the top plate for a cooking device according to the first embodiment of the present invention.

FIG. 2 is a vertical sectional front view for illustrating the vicinity of the touch panel part 2b. As illustrated in FIG. 2, a light-shielding film 3 is formed on a lower surface 2c (surface on a side opposite to a surface on which the pot or the like is placed) of the glass sheet 2 through sputtering. The light-shielding film 3 is a film containing an oxide, a nitride, or an oxynitride of a transition metal of Group 6 to Group 11 on the periodic table.

In this embodiment, the light-shielding film 3 is made of an oxynitride of Cu being the transition metal of Group 11 on the periodic table. As a modified example, the light-shielding film 3 maybe made of an oxynitride of Cr being the transition metal of Group 6 on the periodic table. Even in this case, the light-shielding film 3 is formed on the lower surface 2c of the glass sheet 2 through sputtering. The light-shielding film 3 may be formed entirely on the lower surface 2c of the glass sheet 2 or only on a region that can shield at least a heater or the like arranged inside the cooking device.

On a side opposite to the glass sheet 2 through the light-shielding film 3 therebetween (below the light-shielding film 3), a touch sensor 4 configured to detect contact of a human body (finger) with the touch panel is arranged. Further, a light-emitting device 5 configured to emit light beams L to be transmitted through the light-emitting film 3 to illuminate the touch panel is arranged below the touch sensor 4. The light-emitting device 5 includes a plurality of light-emitting diodes configured to emit the light beams L of different colors (for example, blue, yellow, green, red, and the like).

For the top plate 1 for a cooking device, transmissivity to the light beams L, each having a wavelength of from 400 nm to 700 nm, is set in a range of from 3% to 43%. A magnitude of the transmissivity can be regulated by, for example, changing a composition or a thickness of the light-shielding film 3. Further, a value of an electrical resistance (sheet resistance) is set to 3 k$\Omega$/□ or larger. A magnitude of the value of the electrical resistance can be regulated by, for example, changing the composition or the thickness of the light-shielding film 3 formed through sputtering. In addition, in this embodiment, a value obtained by dividing a maximum value of the transmissivity of the top plate 1 for a cooking device to the light having the wavelength of from 400 nm to 700 nm by a minimum value thereof is set to 4.0 or smaller. Further, it is preferred to set reflectance of the top plate 1 for a cooking device to 10% or smaller, more preferably, to 5% or smaller.

Operations and effects of the above-mentioned top plate for a cooking device according to the first embodiment are described.

According to the top plate 1 for a cooking device according to the first embodiment, various colors other than red can be achieved as a color of the light-shielding film 3. Further, the light-shielding film 3 has the value of the electrical resistance of 3 k$\Omega$/□ or larger, and hence insulating properties can be secured.

When the light-shielding film 3 made of the oxynitride of Cu is used as the light-shielding film 3, the insulating properties can be further improved while various colors other than red (color close to grey) are achieved as the color. Meanwhile, when the light-shielding film 3 made of the oxynitride of Cr is used as the light-shielding film 3, the color can be made closer to grey while the insulating properties are secured.

In the top plate 1 for a cooking device comprising the light-shielding film 3, the value of the transmissivity is reduced to be as low as 3% to 43% in the range of the wavelength of from 400 nm to 700 nm. Therefore, the light-shielding film 3 becomes more suitable to visually shield an inside of the cooking device. Further, a fluctuation range of the transmissivity can be reduced in the range of the wavelength of from 400 nm to 700 nm. As a result, the light beams L emitted from the light-emitting diodes can be uniformly transmitted regardless of the colors of the emitted light beams from the light-emitting diodes.

EXAMPLES

As Examples of the present invention, a light-shielding film was formed on a glass sheet through sputtering to manufacture a top plate for a cooking device. Then, for items (1) to (3), specifically, (1) the color of the formed light-shielding film, (2) the transmissivity of the top plate for a cooking device to light having the wavelength of from 400 nm to 700 nm, and (3) the value of the electrical resistance of the light-shielding film were examined. This examination was carried out for a top plate for a cooking device comprising a light-shielding film made of an oxynitride of Cu (Example 1) and a top plate for a cooking device comprising a light-shielding film made of an oxynitride of Cr (Example 2).

Specific conditions of the formation of the light-shielding film on the glass sheet are described.

For the sputtering, a magnetron sputtering apparatus was used. Further, as targets, a target made of Cu was used in Example 1, and a target made of Cr was used in Example 2. Still further, crystallized glass having a thickness of 4 mm, which is manufactured by Nippon Electric Glass Co. Ltd. (product name: N—O), was used as the glass sheet.

Then, the target and the glass sheet were arranged inside a chamber so that the target and the glass sheet were opposed to each other. Then, the sputtering (reactive sputtering) was performed while causing $O_2$ and $N_2$ in addition to Ar to flow into the chamber.

In Example 1, a ratio of Ar, $O_2$, and $N_2$ to flow into the chamber was set to Ar:$O_2$:$N_2$=83.3:11.1:5.6. In Example 2, the ratio was set to Ar:$O_2$:$N_2$=0:50:50. In addition, the light-shielding film in Example 1 was formed so as to have a thickness of 130 nm. The light-shielding film in Example 2 was formed so as to have a thickness of 15 nm.

As conditions common to Example 1 and Example 2, an atmosphere was adjusted so that a degree of vacuum in the chamber became from $2.0 \times 10^{-1}$ Pa to $6.0 \times 10^{-1}$ Pa. Further, a range of a voltage to be applied was set from 3 kW to 30 kW.

A specific method of examining the above-mentioned items (1) to (3) is described.

(1) The color of the light-shielding film was checked visually. (2) For the transmissivity of the top plate for a cooking device, a maximum value and a minimum value of the transmissivity (incident angle 0°) to the light having the wavelength of from 400 nm to 700 nm were determined through use of a spectrophotometer manufactured by Hitachi, Ltd. (product name: U-4100). (3) For the value of the electrical value of the light-shielding film, the value of the electrical resistance (sheet resistance) was determined through use of Loresta MP manufactured by Mitsubishi Chemical Corporation.

Results of the examinations for the above-mentioned items (1) to (3) are described.

In Example 1, (1) the color of the light-shielding film was close to grey. (2) The maximum value of the transmissivity of the top plate for a cooking device was 41.7%, and the minimum value thereof was 4.1%. (3) The value of the electrical resistance of the light-shielding film was $1.4 \times 10^5$ k$\Omega$/□.

In Example 2, (1) the color of the light-shielding film was close to grey. (2) The maximum value of the transmissivity of the top plate for a cooking device was 13.3%, and the minimum value thereof was 7.1%. (3) The value of the electrical resistance of the light-shielding film was 3.2 k$\Omega$/□.

As described above, it is understood from the results of examinations that the color closer to grey was obtained as the color of the light-shielding film in both of Example 1 and Example 2. Further, it is understood that a variation range of the transmissivity of the top plate for a cooking device is reduced in the range of the wavelength of from 400 nm to 700 nm in both of Example 1 and Example 2. Further, it is understood that the sufficient value of the electrical value for securing the insulating properties of the light-shielding film was obtained in both of Example 1 and Example 2.

<Second Embodiment>

A top plate for a cooking device according to a second embodiment of the present invention is described. In the second embodiment and a third embodiment described below, the items that have already been described in the first embodiment are denoted by the same reference symbols in the drawings referred to in the second embodiment and the third embodiment. Thus, the overlapping description is omitted, and only differences from the first embodiment are described.

The top plate 1 for a cooking device according to the second embodiment differs from the above-mentioned top plate 1 for a cooking device according to the first embodiment in that the kind of light-shielding film 3 formed on the lower surface 2c of the glass sheet 2 is different.

In the second embodiment, the light-shielding film 3 contains two or more kinds of metal oxides selected from the group consisting of CoO, NiO, $Fe_2O_3$, $MoO_6$, $MnO_2$, and $Cr_2O_3$, and $SiO_2$ in which a content of the metal oxides is set to 0.01% to 60% by mass. As one modified example, the light-shielding film 3 may contain $SiO_2$, NiO, and CoO in which a content (total content) of NiO and CoO is set to 0.01% to 60% by mass. Further, as another modified example, the light-shielding film 3 may contain $SiO_2$, NiO, CoO, and $Fe_2O_3$ in which a content (total content) of NiO, CoO, and $Fe_2O_3$ is set to 0.01% to 60% by mass. The light-shielding film 3 is formed on the glass sheet 2 through sputtering as in the first embodiment described above.

Even with the top plate 1 for a cooking device according to the second embodiment, various colors other than red can be achieved as the color of the light-shielding film 3. The light-shielding film 3 is increased in electrical resistance, and hence the insulating properties can be secured.

<Third Embodiment>

A top plate for a cooking device according to the third embodiment of the present invention is described.

Figure 3:
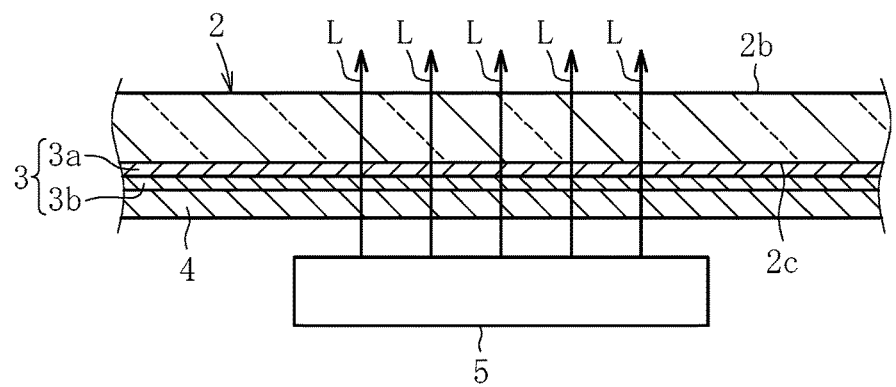
FIG. 3 is a vertical sectional front view for illustrating the vicinity of a touch panel part in a top plate for a cooking device according to a third embodiment of the present invention.

FIG. 3 is a vertical sectional front view for illustrating the vicinity of the touch panel part 2b in the top plate 1 for a cooking device according to the third embodiment. As illustrated in FIG. 3, the top plate 1 for a cooking device according to the third embodiment differs from the above-mentioned top plate 1 for a cooking device according to the first embodiment in that the kind of light-shielding film 3 formed on the lower surface 2c of the glass sheet 2 is different and in that the light-shielding film 3 is formed by laminating a first layer 3a and a second layer 3b.

In the third embodiment, the light-shielding film 3 is formed by laminating the first layer 3a containing $SiO_2$ and CuO in which a content of CuO is set from 0.01% to 30% by mass and the second layer 3b made of Si. As a modified example, the first layer 3a may contain $SiO_2$ and CoO in which a content of CoO is set from 0.01% to 30% by mass. Further, in the top plate 1 for a cooking device, a value obtained by dividing the maximum value of the transmissivity to the light having the wavelength of from 400 nm to 700 nm by the minimum value thereof is set to 4.0 or smaller. A magnitude of the transmissivity of the top plate 1 for a cooking device to the light beams L, each having the wavelength of from 400 nm to 700 nm, can be regulated by changing compositions or thicknesses of the first layer 3a and the second layer 3b. It is preferred that the value obtained by dividing the maximum value of the transmissivity by the minimum value be set to 2.5 or smaller, more preferably, 2.0 or smaller.

Further, in this embodiment, the first layer 3a is directly formed on the glass sheet 2, and the second layer 3b is further formed on the first layer 3a. The first layer 3a is formed on the glass sheet 2 through sputtering. Then, after the first layer 3a is formed on the glass sheet 2, the second layer 3b is formed on the first layer 3a through sputtering. As a modified example, the second layer 3b may be directly formed on the glass sheet 2, and the first layer 3a may be formed on the second layer 3b.

Here, the first layer 3a has high transmissivity to light having a short wavelength and has low transmissivity to light having a long wavelength in the visible light region. Thus, the first layer 3a has a color close to blue. Further, the the second layer 3b has low transmissivity to the light having the short wavelength and has high transmissivity to the light having the long wavelength in the visible light region. Thus, the second layer 3b has a color close to red.

Even with the top plate 1 for a cooking device according to the third embodiment, the light-shielding film 3 may have a color close to grey. Further, the light-shielding film 3 is increased in electrical resistance, and hence the insulating properties can be secured. Further, according to the top plate 1 for a cooking device of the third embodiment, the following operations and effects can also be obtained.

In the top plate 1 for a cooking device comprising the light-shielding film 3, the value of the transmissivity can be extremely reduced in the visible light region. With this, the light-shielding film 3 is more suitable to visually shield the inside of the cooking device. Further, in the top plate 1 for a cooking device, the variation range of the transmissivity is also extremely reduced in the range of the wavelength of from 400 nm to 700 nm. Therefore, the emitted light beams L can be uniformly transmitted regardless of the colors of the light beams emitted from the light-emitting diodes.

Here, the top plate for a cooking device according to the present invention is not limited to the configurations described with the above-mentioned embodiments. For example, the light-emitting film may have a configuration other than the configurations described in the embodiments. Another configuration may be employed as long as the film contains the oxide, the nitride, or the oxynitride of the transition metal of Group 6 to Group 11 on the periodic table.

REFERENCE SIGNS LIST 1 top plate for cooking device
2 glass sheet
2a cooking part
2b touch panel part
2c lower surface
3 light-shielding film
3a first layer
3b second layer
4 touch sensor
5 light-emitting device
L light beam

The invention claimed is:

1. A top plate for a cooking device, the top plate comprising:
a glass sheet;
a light-shielding film formed on one surface of the glass sheet through sputtering;
a touch panel provided on the glass sheet;
a touch sensor arranged at a side opposite to the touch panel, the light-shielding film being located between the touch sensor and the touch panel; and
a light-emitting device configured to emit light to be transmitted through the touch sensor and the light-shielding film to illuminate the touch panel,
wherein the light-shielding film contains an oxide, a nitride, or an oxynitride of a transition metal of Group 6 to Group 11 on a periodic table, and
wherein the touch sensor and the light-emitting device overlap in plan view of the glass sheet.

2. The top plate for a cooking device according to claim 1, wherein the light-shielding film contains an oxynitride of Cu or Cr.

3. The top plate for a cooking device according to claim 2, wherein transmissivity to light having a wavelength of from 400 nm to 700 nm is in a range of from 3% to 43%.

4. The top plate for a cooking device according to claim 1, wherein the light-shielding film contains $SiO_2$, and CuO or CoO and is formed by laminating a first layer having a content of CuO or CoO set from 0.01% to 30% by mass and a second layer made of Si.

5. The top plate for a cooking device according to claim 1, wherein the light-shielding film contains two or more kinds of metal oxides selected from the group consisting of CoO, NiO, $Fe_2O_3$, $MoO_6$, $MnO_2$, and $Cr_2O_3$, and $SiO_2$ in which a content of the metal oxides is set to 0.01% to 60% by mass.

6. The top plate for a cooking device according to claim 1, wherein the light-shielding film has a value of an electrical resistance of 3 kΩ/□ or larger.

7. The top plate for a cooking device according to claim 1, wherein a value obtained by dividing a maximum value of transmissivity to light having a wavelength of from 400 nm to 700 nm by a minimum value thereof is 4.0 or smaller.

8. The top plate for a cooking device according to claim 1, wherein the light-emitting device is a light-emitting diode.

* * * * *